(12) United States Patent
Di Censo et al.

(10) Patent No.: US 11,584,228 B2
(45) Date of Patent: Feb. 21, 2023

(54) MODULAR DISPLAY ASSEMBLY AND VEHICLE INTERIOR PART HAVING A MODULAR DISPLAY ASSEMBLY

(71) Applicant: Faurecia Interior Systems, Inc., Auburn Hills, MI (US)

(72) Inventors: Davide Di Censo, Sunnyvale, CA (US); Cedric Ketels, Mountain View, CA (US); Thomas Dessapt, Sunnyvale, CA (US)

(73) Assignee: Faurecia Interior Systems, Inc., Auburn Hills, MI (US)

( * ) Notice: Subject to any disclaimer, the term of this patent is extended or adjusted under 35 U.S.C. 154(b) by 372 days.

(21) Appl. No.: 16/861,789

(22) Filed: Apr. 29, 2020

(65) Prior Publication Data
US 2021/0339627 A1    Nov. 4, 2021

(51) Int. Cl.
| | |
|---|---|
| *B60K 35/00* | (2006.01) |
| *B60R 11/02* | (2006.01) |
| *B60K 37/02* | (2006.01) |
| *B60R 11/00* | (2006.01) |

(52) U.S. Cl.
CPC .............. *B60K 35/00* (2013.01); *B60K 37/02* (2013.01); *B60R 11/0235* (2013.01); *B60K 2370/152* (2019.05); *B60K 2370/1523* (2019.05); *B60K 2370/794* (2019.05); *B60K 2370/80* (2019.05); *B60R 2011/0021* (2013.01); *B60R 2011/0045* (2013.01)

(58) Field of Classification Search
CPC ...... B60K 35/00; B60K 37/02; B60R 11/0235
See application file for complete search history.

(56) References Cited

U.S. PATENT DOCUMENTS

| | | | |
|---|---|---|---|
| 8,113,695 B2 | 2/2012 | Meinke et al. | |
| 8,449,161 B2 | 5/2013 | Igoe et al. | |
| 8,567,977 B2* | 10/2013 | Pijlman | G02F 1/133606 362/97.3 |
| 2018/0345791 A1* | 12/2018 | Hallack | B60R 13/04 |
| 2019/0135199 A1 | 5/2019 | Galan Garcia | |
| 2021/0174105 A1* | 6/2021 | He | G06V 10/141 |
| 2021/0339627 A1* | 11/2021 | Di Censo | B60K 35/00 |

FOREIGN PATENT DOCUMENTS

| | | |
|---|---|---|
| EP | 3053778 A1 | 8/2016 |
| FR | 3059817 A1 | 6/2018 |
| WO | WO2019165441 A1 | 8/2019 |

* cited by examiner

*Primary Examiner* — David E Choi
(74) *Attorney, Agent, or Firm* — Reising Ethington P.C.

(57) ABSTRACT

A modular display assembly that can easily be installed in a vehicle interior part. The modular display assembly includes a carrier panel having an outer frame and a recessed display region, a display panel situated in the recessed display region of the carrier panel, a diffuser layer that at least partially covers the recessed display region at a location spaced from the display panel to thereby create an optical transmission layer between the display panel and the diffuser layer, and a surface panel that at least partially covers the diffuser layer. The surface panel at least partially rests against the outer frame of the carrier panel.

16 Claims, 5 Drawing Sheets

MODULAR DISPLAY ASSEMBLY AND VEHICLE INTERIOR PART HAVING A MODULAR DISPLAY ASSEMBLY

TECHNICAL FIELD

The present disclosure is related generally to vehicle interiors and, more particularly, to modular display assemblies for vehicle interior parts.

BACKGROUND

Backlit panels and display assemblies are common in vehicle interiors. Such display assemblies, when integrated into vehicle interior parts, typically involve additional manufacturing steps when making the vehicle parts. Simplifying the manufacture of vehicle interior parts when integrating display assemblies is accordingly desirable. To simplify the manufacture, a modular display assembly may be installed into a separately manufactured vehicle interior part. Furthermore, it is advantageous to have an aesthetically pleasing visual homogeneity of the modular display assembly with the vehicle interior part.

In PCT Publication No. 2019/165441 to Harmelink et al., a multilayer, vehicle interior panel is disclosed where a top layer of the panel is a wood veneer cover and another layer includes an LED array or display layer. The display layer in Harmelink is wholly integrated within the vehicle interior panel such that the display panel is not a more modular component of the part. This can complicate manufacturing.

SUMMARY

An illustrative modular display assembly includes a carrier panel having an outer frame and a recessed display region; a display panel situated in the recessed display region of the carrier panel; a diffuser layer that at least partially covers the recessed display region at a location spaced from the display panel to thereby create an optical transmission layer between the display panel and the diffuser layer; and a surface panel that at least partially covers the diffuser layer, wherein the surface panel at least partially rests against the outer frame of the carrier panel.

In various embodiments, the recessed display region includes an internal step having an internal wall and a rest platform.

In various embodiments, the display panel rests on the rest platform, and a height of the display panel is less than a height of the internal wall.

In various embodiments, an outer perimeter shape of the display panel is different from an outer perimeter shape of the surface panel.

In various embodiments, the display panel includes a plurality of light sources arranged in a matrix.

In various embodiments, a pitch between two or more light sources of the plurality of light sources is correlated with a height of the optical transmission layer.

In various embodiments, the pitch between two or more light sources of the plurality of light sources is within 5% of the height of the optical transmission layer.

In various embodiments, the display panel is a light emitting diode (LED) strip, an LED matrix, an organic LED screen, or a liquid crystal display (LCD) screen.

In various embodiments, the outer frame of the carrier panel has a raised lip with an interior frame wall and a top edge.

In various embodiments, the surface panel at least partially rests against the interior frame wall such that the surface panel is at least partially nested within the carrier panel and the diffuser panel is wholly nested within the carrier panel.

In various embodiments, the modular assembly is included in a vehicle interior part.

In various embodiments, a material used for the surface panel is the same as a material used for an A-surface of the vehicle interior part.

In various embodiments, the carrier panel is sized to fit in a bay of the vehicle interior part such that a mounting surface of the carrier panel is entirely recessed within the bay.

In various embodiments, the bay is a recess in a door panel.

In various embodiments, the carrier panel includes a power connector that is configured to mate with a power source of the vehicle.

In various embodiments, the optical transmission layer comprises an air space or other optically-transmissive fluid space between the diffuser layer and display panel.

In various embodiments, the optical transmission layer comprises an optically-transmissive solid material located between the diffuser layer and display panel.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described herein is a modular display panel that can be easily integrated into a vehicle interior part. Combining several layers into one installable, modular display assembly can streamline the vehicle manufacturing and assembly process. Certain features of the display assembly described below can provide for a more modular component that has improved visual homogeneity and aesthetic appeal. Providing a modular assembly can allow for the display to be largely assembled remote from the assembly of the vehicle interior part itself. This can improve manufacturing processes by allowing, for example, more efficient installation.

In some embodiments, this modularity can allow for easy replacement by the end consumer, as the end consumer can swap one display assembly with another display assembly, possibly one purchased in the aftermarket.

Figure 1:
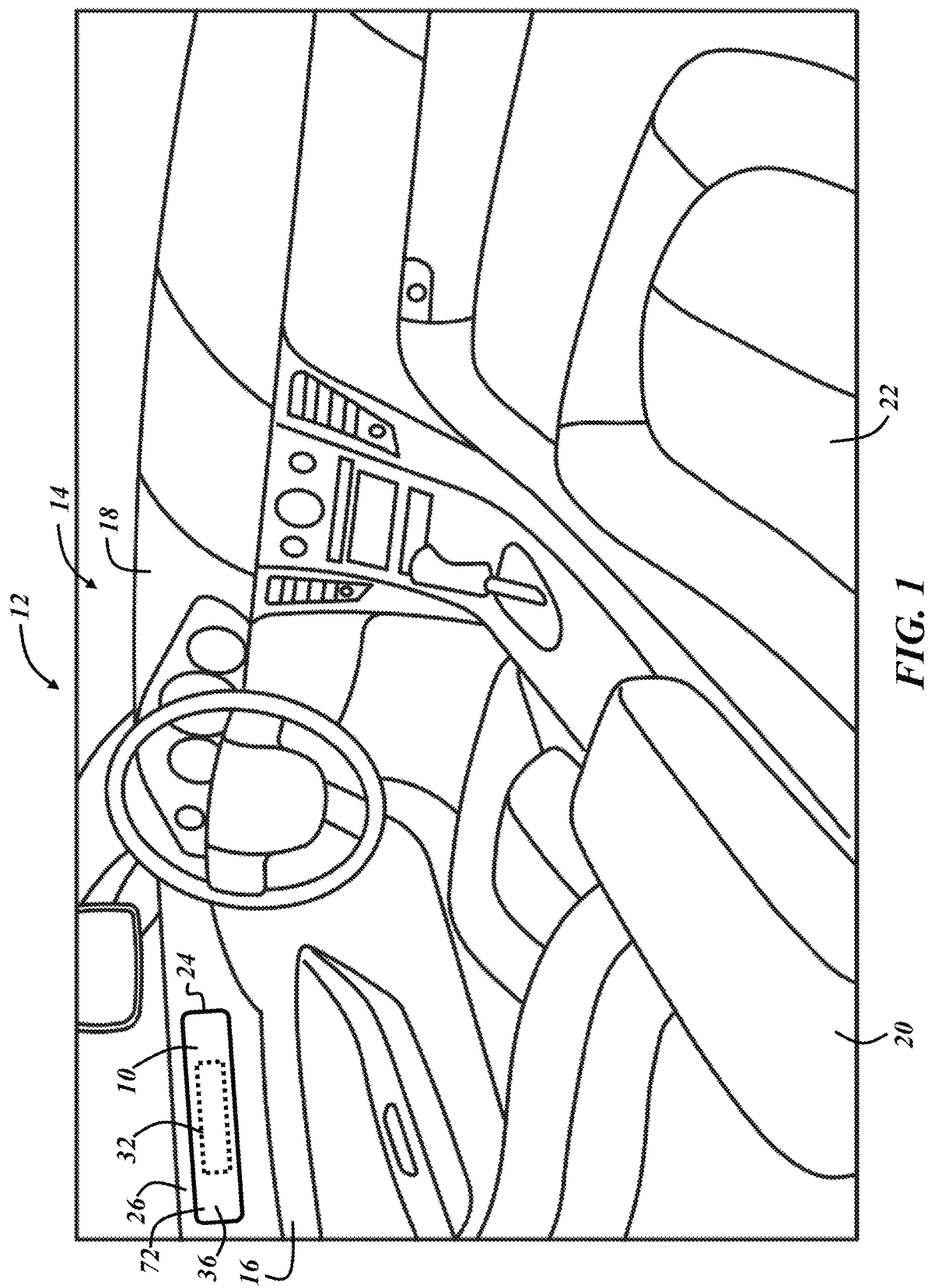
FIG. 1 is a perspective view of the interior of a vehicle passenger cabin equipped with one embodiment of a modular display assembly in a door panel.

FIG. 1 shows one embodiment of a modular display assembly 10 installed within an interior part of a vehicle 12. One or more modular display assemblies 10 can be installed within a number of different parts within the vehicle interior or passenger cabin 14. In this embodiment, the vehicle interior part is a door panel 16. Other example vehicle interior parts that may include display panels as described herein include an instrument panel 18, a console 20, seat 22, or any other feasible part or vehicle interior location.

The modular display assembly 10 is mounted within a recessed area or bay 24 in the door panel 16. This allows for the modular display assembly 10, in the illustrated embodiment, to be flush with an A-surface 26 of the door panel 16. To provide for efficient installation, the modular display assembly 10 and the door panel 16 can be separately manufactured. Then, during the final assembly phase, the modular display assembly 10 can be attached to the door panel 16 through standard manufacturing techniques, such as welding, clipping, fastening, or some other operable technique. This can shield or protect the interior electronic components, such as display panel 32, from the manufacture of the overall interior part or panel 16.

Figure 2:
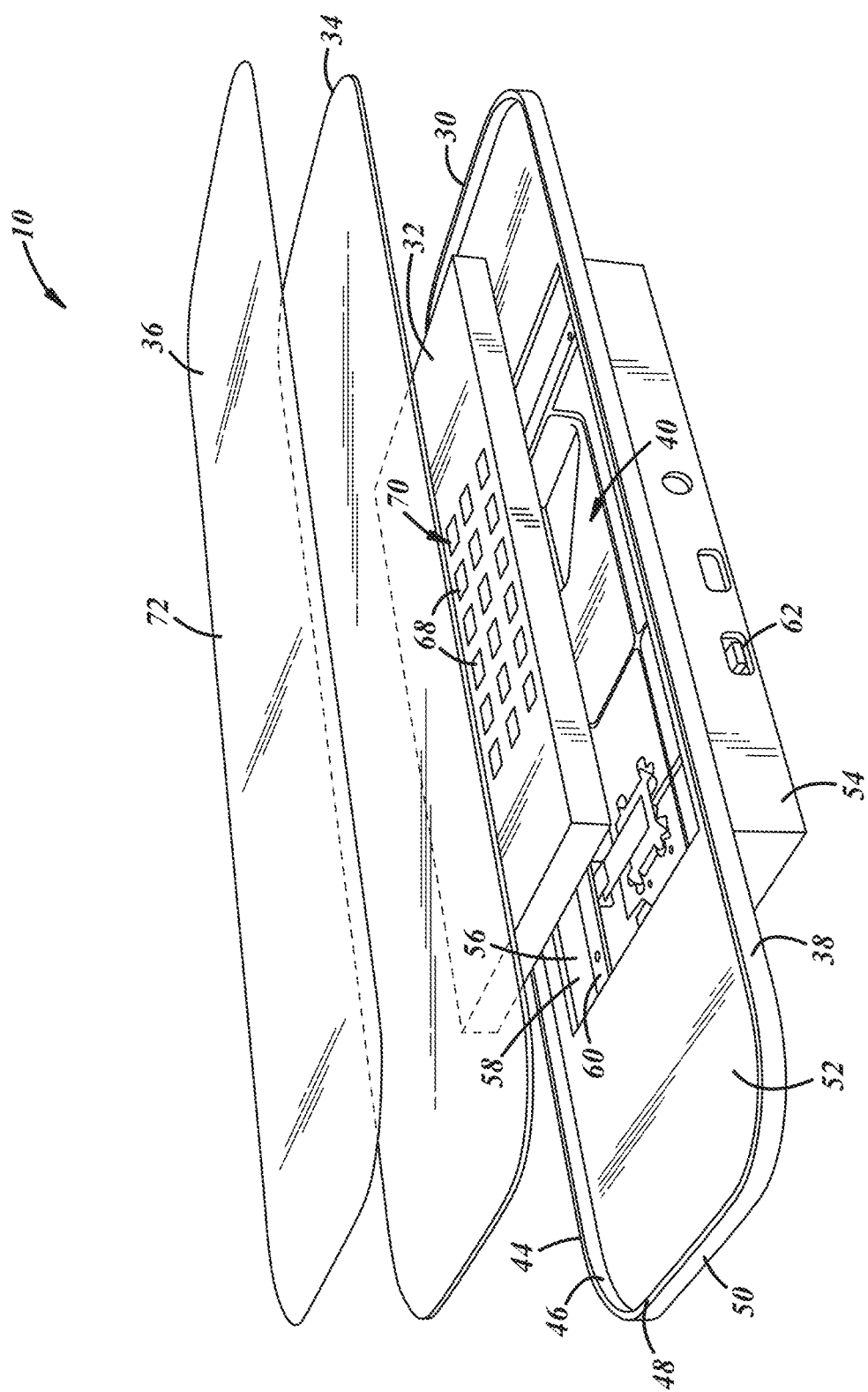
FIG. 2 is an exploded view of the modular display assembly of FIG. 1.
Figure 3:
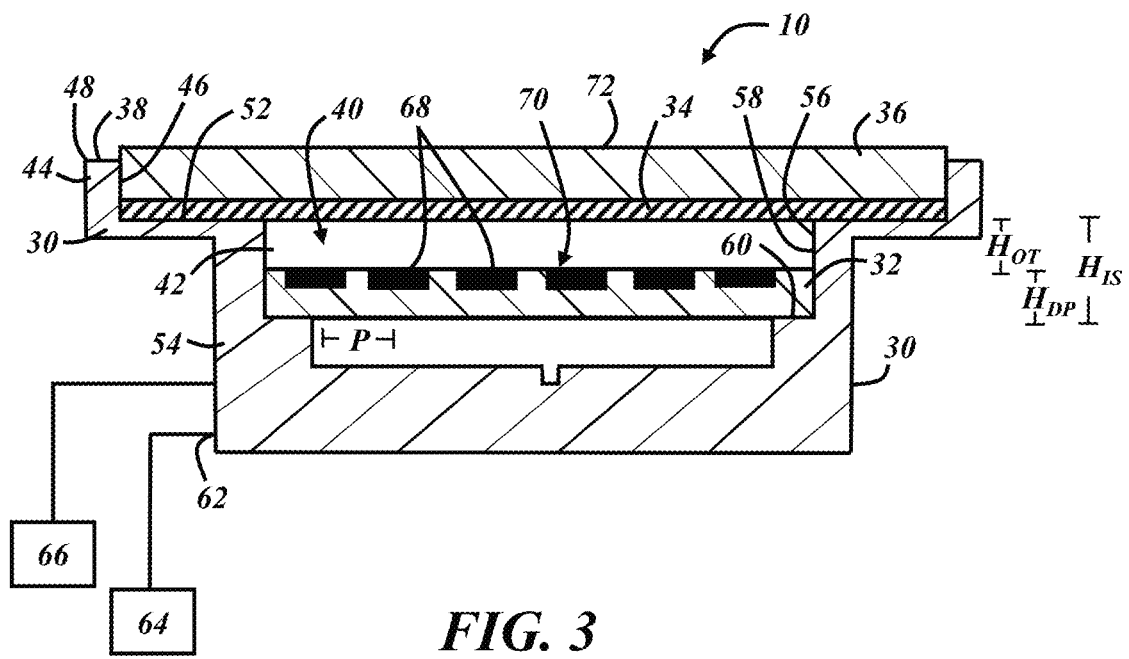
FIG. 3 is a cross-section view of the modular display assembly of FIGS. 1 and 2.

FIG. 2, which is an exploded view, and FIG. 3, which is a cross-section view, show the various components of the modular display assembly 10, including a carrier panel 30, a display panel 32, a diffuser layer 34, and a surface panel 36. The carrier panel 30 includes an outer frame 38 and a recessed display region 40. The display panel 32 is situated within the recessed display region 40 of the carrier panel 30. The diffuser layer 34 at least partially covers, or as shown here, completely covers, the recessed display region 40 and creates an optical transmission layer 42 between the display panel 32 and the diffuser layer 34. The surface panel 36 at least partially covers, or as shown here, completely covers, the diffuser layer 34. The surface panel 36 at least partially rests against the outer frame 38 of the carrier panel 30. Juxtaposing these layers and panels creates a sandwich-type structure that can be assembled within the carrier panel 30 for easier manufacturing that can be put together independently from the rest of the main part and inserted in a receiving bay at a later time. Each layer or panel may itself include multiple layers, additional layers or panels may be included, or certain layers or panels may be omitted. It should also be noted that the figures are not necessarily to scale. For example, certain layer or panel thicknesses or features may be exaggerated for purposes of illustration.

The carrier panel 30 is structured to promote modularity of the assembly 10. The outer frame 38 of the carrier panel 30 can allow for total or partial nesting of the diffuser layer 34 and/or the surface panel 36. The outer frame 38 in this embodiment includes a raised lip 44 that is generally defined by an interior frame wall 46, a top edge 48, and an outer edge 50. The outer frame 38 surrounds the outer edge or perimeter of a mounting surface 52 for supporting the diffuser layer 34. Advantageously, as shown in FIG. 3, the diffuser layer 34 is wholly nested within the carrier panel 30. The surface panel 36 extends to the entirety of the outer frame 38, thereby covering all of the diffuser layer 34 and helping to shield the interior components of the assembly 10. The surface panel 36 can be nested within the carrier panel 30, as shown in FIG. 3, such that it rests directly against the interior frame wall 46. In another embodiment, the surface panel 36 may cover the carrier panel 30. In such an embodiment, the surface panel 36 could rest directly against the top edge 48. Other frame and edge configurations are certainly possible.

The carrier panel 30 includes a recessed display region 40, which is generally situated toward the center of the assembly 10 in this embodiment. The recessed display region 40 includes a back extension 54 that projects outward from the mounting surface 52 and creates an area or space for housing the display panel 32. In some embodiments, the size of the back extension 54 may correspond to the depth of the recess or bay 24 in the vehicle interior part or panel 16. An internal step 56 in the back extension 54 at the recessed display region 40 can help seat or locate the display panel 32. The internal step 56 includes an internal wall 58 that extends between the mounting surface 52 and a rest platform 60.

The recessed display region 40 and/or the back extension 54 of the carrier panel 30 can be configured to allow for power transmission between the vehicle 12 and the display panel 32. However, it is possible in some embodiments to have a distinct and separate power source for the display assembly 10 such that connection to an outside power supply is not necessarily required. As shown in FIG. 2 and schematically illustrated in FIG. 3, a power connector 62 is provided in an outer surface of the back extension 54. The power connector 62 is configured to transmit power from a vehicle power source 64 (e.g., a battery of the vehicle 12) to the display assembly 10. The connector 62 can be a standard connector (e.g., a JST connector) or a surface contact connector. With a standard connector, the connection happens manually, adding a step in the assembly line. Advantageously, with a surface contact connector, the connection happens as part of the assembly process when the carrier panel 30 snaps or clicks into place within the bay 24. Additionally, FIG. 3 shows a controller 66 which is also schematically coupled to the back extension 54 of the carrier panel 30. The controller 66 may be a panel controller, an interior system controller, a vehicle controller, a switch, or other suitable controller. The controller 66 may be a separate controller associated with the vehicle, as schematically illustrated. Or, in other embodiments, the controller 66 may be an integrated component within the assembly 10.

As described above, the carrier panel 30 generally acts as a housing for a number of the components of the modular display assembly 10. Accordingly, a more rigid material for the carrier panel 30 is desirable. The carrier panel 30 may be made from a rigid plastic or metal material, to cite a few examples, and may be formed as a single or multi-piece component. In one example, the material used for the carrier panel 30 is the same as a material used as a substrate in the underlying vehicle part or panel 16 (e.g., fiberglass-reinforced polypropylene). This may facilitate easier attachment between the display assembly 10 and the bay 24 of the vehicle 12.

The display panel 32 includes one or more light sources 68 to provide the visual aesthetic features of the display assembly 10. Only a few of the light sources 68 are labeled in the figures for clarity purposes. The light source 68 can be of any variety, such as a light emitting diode (LED), fiber optic, or other suitable source. In the illustrated embodiments, the display panel 32 is an LED matrix 70 comprising a grid-like arrangement of a plurality of individual LEDs. Operation of the LED matrix 70 and the positioning of the light sources or individual LEDs with respect to each other and the other components of the assembly 10 are detailed further below. The LEDs may be single color LEDs or red-green-blue (RGB) LEDs. In other examples, the display panel 32 is an LED strip, an organic or OLED screen, or a liquid crystal display (LCD) screen. Other lighting types and arrangements are certainly possible. Further, other functionality may be implemented with the display panel 32, such as air purification, audio features such as a subwoofer or other audio system components, scent diffusion, etc.

The display panel 32 is arranged within the recessed display region 40 at a location that is spaced below the diffusion layer 34 to thereby create an optical transmission layer 42 between the display panel 32 and the diffuser layer 34. The optical transmission layer 42 allows for the transmission of light from the light source(s) 68 of the display panel 32 to the diffuser layer 34. The optical transmission layer 42 optimally comprises an air layer or other optically-transmissive fluid space, but in some embodiments, may be a separate piece or component of optically-transmissive material (e.g., translucent or transparent plastic). The size or height $H_{OT}$ of the optical transmission layer 42 is particularly configured to create a desired visual output, visible on the surface panel 36. As will be detailed further below, in an advantageous embodiment, the height $H_{OT}$ of the optical transmission layer 42 is equal to (within manufacturing tolerances or +/−5% of each other) the pitch P or center-to-center spacing between two or more light sources 68 of the matrix 70. In a more particular example, the optical transmission layer 42 is an airgap or space layer having a height $H_{OT}$ between about 0.1 and 10 mm.

The diffuser layer 34 is an opacity layer that helps further diffuse or blur emitted light from the light source(s) 68. The diffuser layer 34 can be made from plastic in one example, or some other operable material such as a light scattering fabric. In some embodiments, the diffuser layer 34 is an integrated layer or part of the surface panel 36. The diffuser layer 34 may have optical features such as scattering dimples or the like to help further diffuse light traveling from the display panel 32, through the optical transmission layer 42, and out of the surface panel 36. The diffuser layer 34 is arranged so as to rest on the mounting surface 52 and cover the recessed display region 40 of the carrier panel 30. Resting the diffuser layer 34 on the mounting surface 52 can more efficiently define the optical transmission layer 42 within the recessed display region 40, as the size of the optical transmission layer 42 in such an embodiment will then depend on the size of the internal step or wall 56, 58 (His) and height of the display panel 32 ($H_{DP}$). In this embodiment, the diffuser layer 34 entirely covers the display panel 32, the recessed display region 40, and the mounting surface 52. In some embodiments, however, the diffuser layer 34 may only cover the display panel 32 or portions of the display panel.

The surface panel 36 is the outermost layer of the display assembly 10 and provides a viewing surface 72 in the interior passenger cabin 14 of the vehicle 12. The surface panel 36 is advantageously made from the same material as the A-surface 26 of the door panel 16 or other vehicle interior part. This allows for the assembly 10 to easily blend into the vehicle interior aesthetic when not illuminated. The surface panel 36 can be any operable material, such as plastic, fabric or skin, a natural material such as wood or leather, synthetic leather, etc. In some implementations, the surface panel 36 is a multilayer structure that matches a multilayer configuration of the door panel 16. For example, one of the layers of a multilayer structured surface panel may be incorporate the diffuser layer 34. In yet another embodiment, the diffuser layer 34 may be a surface texture or the like on the rear side of the surface panel. Other structural variations are certainly possible. For example, an outer perimeter shape of the surface panel 36 can be different from or the same as the outer perimeter shape of the display panel 32. The size and shape of the surface panel 36 is thus independent from the size of the display panel 32, and can be based on the specific styling and design of the main part or panel 16.

Unlike typical information-based display panels in vehicles, which are high-resolution, the modular display assembly 10 can be designed to provide a more blurred, low-resolution illuminated design element. The low-resolution appearance (less than 300 dpi) helps to create an abstract illumination pattern. This can be a more cost-effective assembly, as fewer light sources are needed to provide the desired aesthetic. Further, certain structural features of the assembly 10, such as correlating the spacing or pitch P between the light sources 68 with the height $H_{OT}$ of the optical transmission layer, can help provide this desired aesthetic. In an advantageous implementation, the pitch P is equal to the $H_{OT}$ (or within 5% thereof to allow for manufacturing tolerances). This spacing can help create a more desirable appearance, as it will adequately diffuse the emitted light so that the individual pixels are not visible. If $H_{OT}$ is less than the pitch P, the individual pixels may be visible and the resulting illumination pattern could be pixelated. If $H_{OT}$ is greater than the pitch P, the intensity can undesirably drop.

Figure 4:
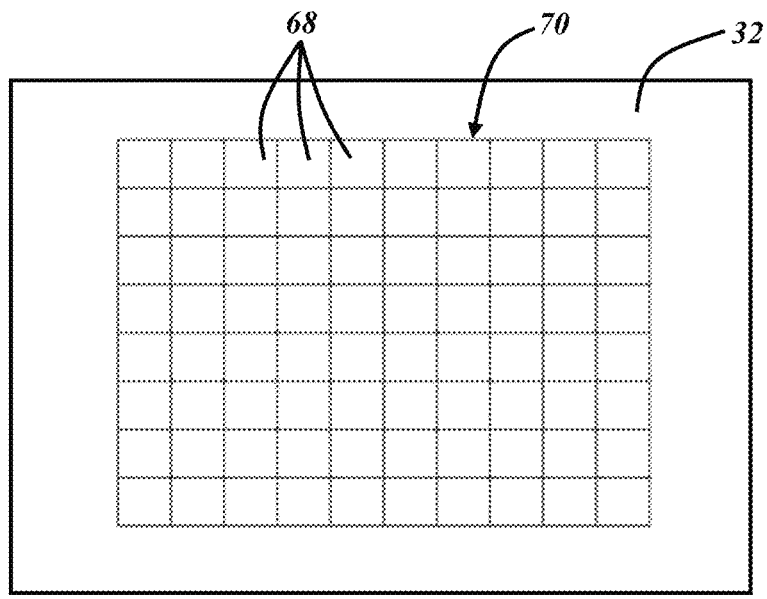
FIG. 4 a schematic representation of a display panel for a modular display assembly in accordance with one embodiment.
Figure 5:
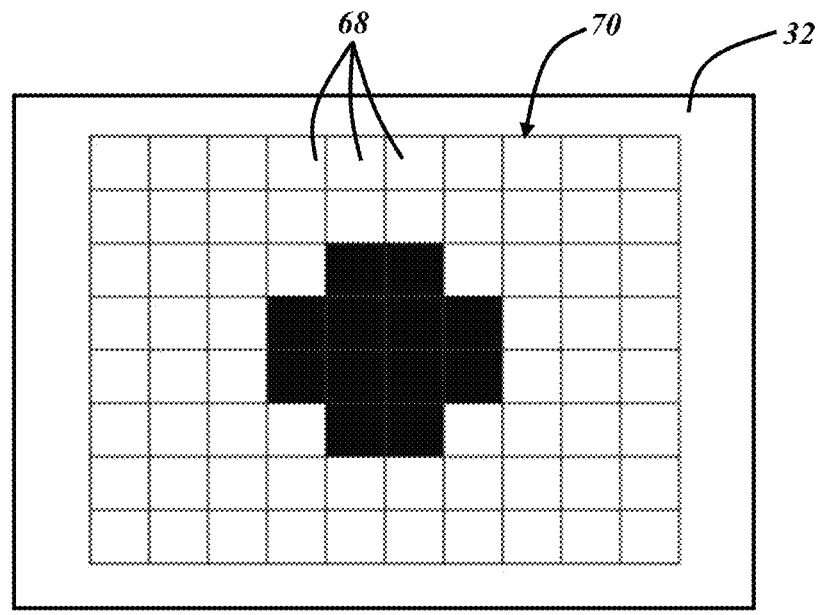
FIG. 5 is an illuminated representation of the display panel of FIG. 4.
Figure 6:
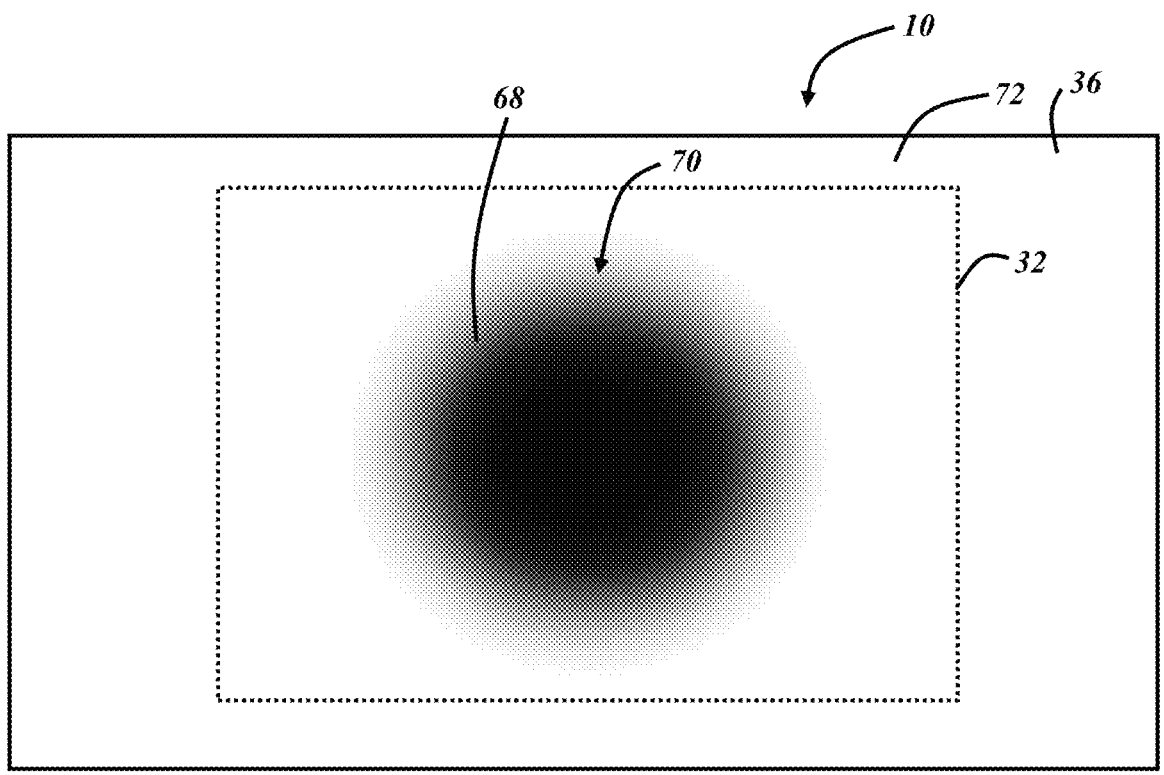
FIG. 6 is another illuminated representation of the display panel of FIGS. 4 and 5.

FIGS. 4-6 schematically illustrate a desirable operational scheme for the display panel 32 and the modular display assembly 10. In FIG. 4, the display panel 32 is shown with no light sources 68 illuminated. In FIG. 5, the display panel 32 is shown with select light sources 68 illuminated toward the center of the matrix 70. The resulting appearance given this illumination pattern is shown in FIG. 6. FIG. 6 illustrates the blurred, low-resolution appearance created with the appropriately sized features of the display assembly 10. In this example, the pitch P is equal to the height $H_{OT}$ of the optical transmission layer 42 to create the desired low-resolution appearance.

Figure 7:
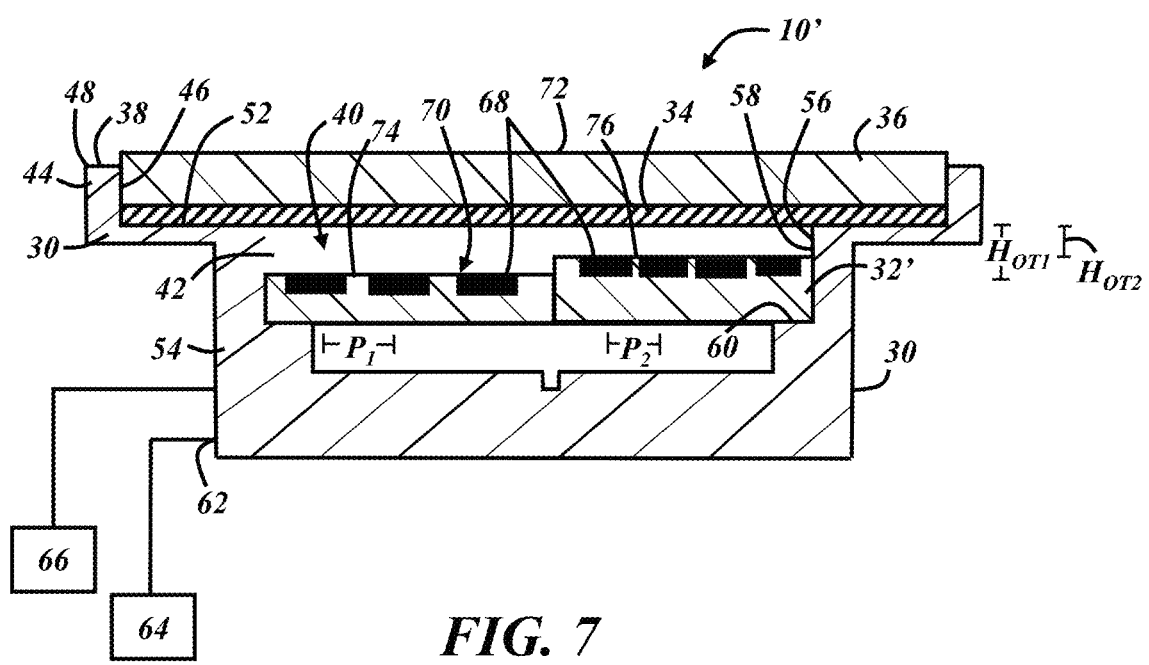
FIG. 7 is a cross-section view of a modular display assembly according to another embodiment.

FIG. 7 illustrates an alternate embodiment of the display assembly 10'. In this example embodiment, the display panel 32' includes two subsections 74, 76. In the first subsection 74, the pitch $P_1$ between the light sources 68 is greater, and thus the height of the optical transmission layer 42 is greater in this area ($H_{OT1}$). In the second subsection 76, the pitch $P_2$ between the light sources 68 is smaller, and thus the height of the optical transmission layer 42 is smaller in this area ($H_{OT2}$). In this embodiment, the subsections 74, 76 do not have to be flush with each other, but can be placed at different heights with respect to the other components of the assembly 10 to account for the different spacing from the diffuser layer 34 required to maintain visual homogeneity. Other configurations having more subsections, various pitches between light sources, etc. are certainly possible.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A modular display assembly for a vehicle, comprising:
   a carrier panel having an outer frame and a recessed display region;
   a display panel situated in the recessed display region of the carrier panel;
   a diffuser layer that at least partially covers the recessed display region at a location spaced from the display panel to thereby create an optical transmission layer between the display panel and the diffuser layer, wherein the optical transmission layer comprises an airgap having a height between 0.1 mm and 10 mm, inclusive; and
   a surface panel that at least partially covers the diffuser layer, wherein the surface panel at least partially rests against the outer frame of the carrier panel.

2. The modular display assembly of claim 1, wherein the recessed display region includes an internal step having an internal wall and a rest platform.

3. The modular display assembly of claim 2, wherein the display panel rests on the rest platform, and a height of the display panel is less than a height of the internal wall.

4. The modular display assembly of claim 1, wherein an outer perimeter shape of the display panel is different from an outer perimeter shape of the surface panel.

5. The modular display assembly of claim 1, wherein the display panel includes a plurality of light sources arranged in a matrix.

6. The modular display assembly of claim 5, wherein a pitch between two or more light sources of the plurality of light sources is correlated with a height of the optical transmission layer.

7. A modular display assembly for a vehicle, comprising:
   a carrier panel having an outer frame and a recessed display region;
   a display panel situated in the recessed display region of the carrier and including a plurality of light sources arranged in a matrix;
   a diffuser layer that at least partially covers the recessed display region at a location spaced from the display panel to thereby create an optical transmission layer between the display panel and the diffuser layer, wherein a pitch between two or more light sources of the plurality of light sources is correlated with a height of the optical transmission layer, and wherein the pitch between two or more light sources of the plurality of light sources is within 5% of the height of the optical transmission layer; and
   a surface panel that at least partially covers the diffuser layer, wherein the surface panel at least partially rests against the outer frame of the carrier panel.

8. The modular display assembly of claim 1, wherein the display panel is a light emitting diode (LED) strip, an LED matrix, an organic LED screen, or a liquid crystal display (LCD) screen.

9. The modular display assembly of claim 1, wherein the outer frame of the carrier panel has a raised lip with an interior frame wall and a top edge.

10. The modular display assembly of claim 9, wherein the surface panel at least partially rests against the interior frame wall such that the surface panel is at least partially nested within the carrier panel and the diffuser panel is wholly nested within the carrier panel.

11. A vehicle interior part comprising the modular display assembly of claim 1.

12. The vehicle interior part of claim 11, wherein a material used for the surface panel is the same as a material used for an A-surface of the vehicle interior part.

13. The vehicle interior part of claim 11, wherein the carrier panel is sized to fit in a bay of the vehicle interior part such that a mounting surface of the carrier panel is entirely recessed within the bay.

14. The vehicle interior part of claim 13, wherein the bay is a recess in a door panel.

15. The vehicle interior part of claim 13, wherein the carrier panel includes a power connector that is configured to mate with a power source of the vehicle.

16. A modular display assembly for a vehicle, comprising:
   a carrier panel having an outer frame and a recessed display region;
   a display panel situated in the recessed display region of the carrier panel;
   a diffuser layer that at least partially covers the recessed display region at a location spaced from the display panel to thereby create an optical transmission layer between the display panel and the diffuser layer; and
   a surface panel that at least partially covers the diffuser layer, wherein the surface panel at least partially rests against the outer frame of the carrier panel, and wherein the surface panel wholly covers the carrier panel or is only partially nested into the carrier panel such that a portion of the surface panel extends beyond the carrier panel.

* * * * *